Dec. 5, 1967     O. EMELE     3,356,217
ARRANGEMENT FOR AUTOMATICALLY DISPLACING PLATES
AND FRAMES, ESPECIALLY IN FILTER PRESSES
Filed July 30, 1964     2 Sheets-Sheet 1
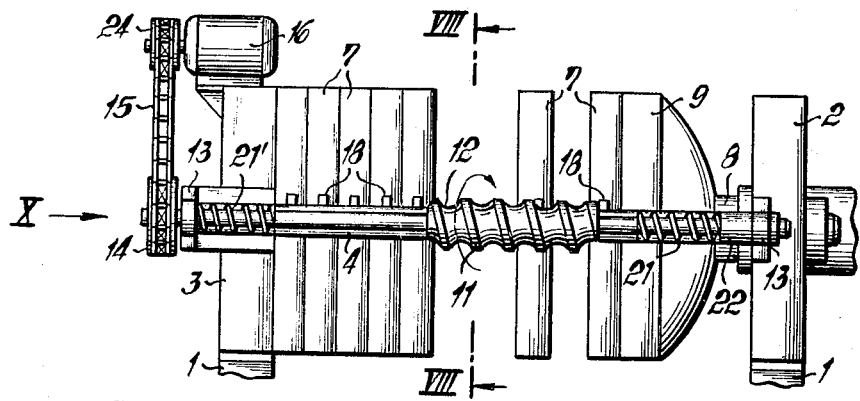
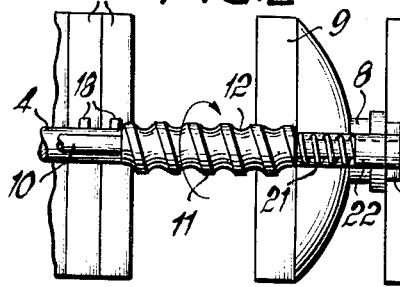
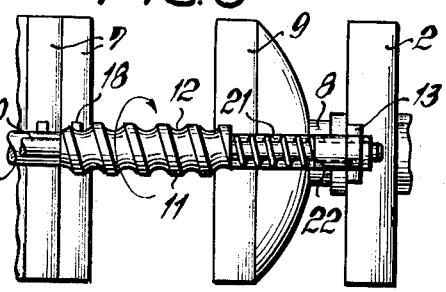
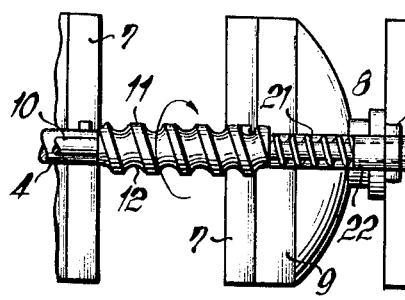
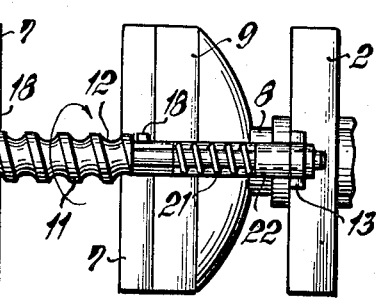
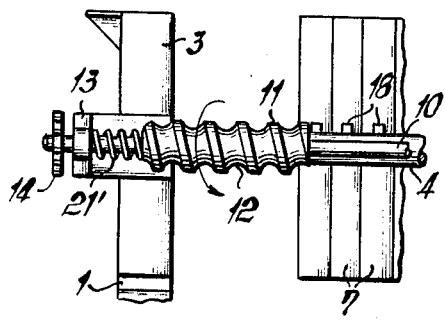
INVENTOR
Otto Emele

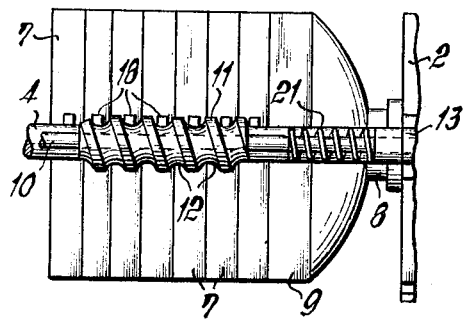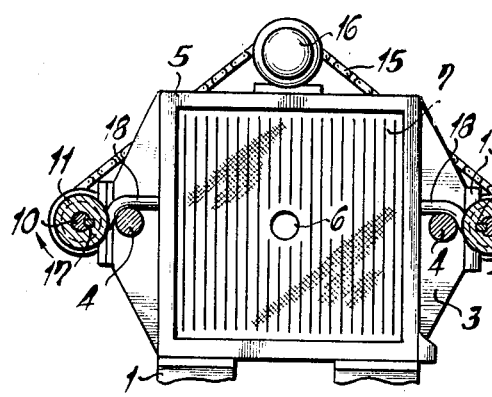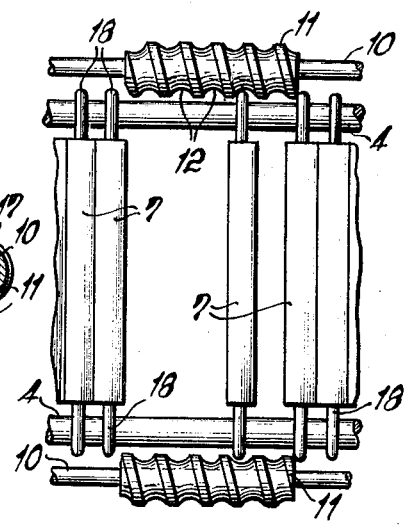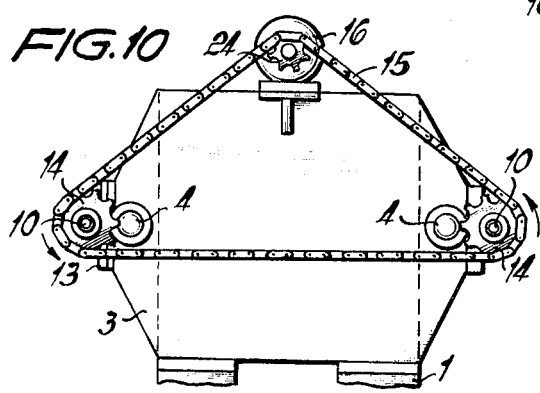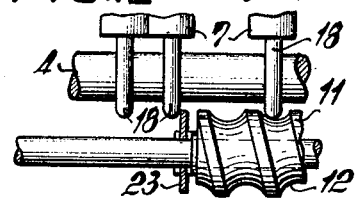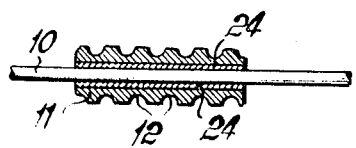

United States Patent Office 3,356,217
Patented Dec. 5, 1967

3,356,217
ARRANGEMENT FOR AUTOMATICALLY DISPLACING PLATES AND FRAMES, ESPECIALLY IN FILTER PRESSES
Otto Emele, Kressbronn (Bodensee), Germany, assignor to Seitz-Werke G.m.b.H., Bad Kreuznach, Germany
Filed July 30, 1964, Ser. No. 386,288
Claims priority, application Germany, Aug. 9, 1963
E 25,316
13 Claims. (Cl. 210—143)

The present invention relates to an arrangement for automatically displacing plates and frames, especially in filter presses.

In plate and frame filter presses, following the completion of each filtering operation, the filter chambers are freed from filter residues in filter cakes by successively displacing the plates and frames defining the filter chambers.

Automatic displacing devices are known which comprise primarily chains equipped with catches or dogs which circulate over a series of sprocket wheels. Displacing devices of this type are, however, not very suitable for the rather rough filter press operation, particularly due to the fact that the numerous moving elements and the bearing supports therefor become easily soiled, for instance by filter material-slurry, which may be squeezed out from filter chambers which have become leaky or untight. This soiling not only brings about a rapid wear of the movable elements but also affects the safety of function of such devices.

Moreover, circulating chain drives, as a rule, require a relatively bulky construction which impedes accessibility to the filter press.

It may also be added that chain drives along a press frequently cause accidents. Moreover, experience has shown that the moist plates very often stick to each other in view of the filter cake therebetween, so that frequently, a situation is encountered according to which, when a dog engages a plate, at the same time one or more plates are displaced. If this occurs, a proper automatic operation of the displacing arrangement is impossible.

It is, therefore, an object of the present invention to provide an arrangement for automatically displacing plates and frames, especially in filter presses, which will overcome the above-mentioned drawbacks.

It is another object of this invention to provide an arrangement as set forth in the preceding paragraph which, while being extremely reliable in operation, will be very simple in construction.

Still another object of this invention consists in the provision of an automatic displacing arrangement for plates and frames, especially in filter presses, which will assure that only one plate or frame at a time will be displaced.

It is also an object of this invention to provide an automatic displacing arrangement as set forth above, which may be built into heretofore designed filter presses.

These and other objects and advantages of the invention will appear more clearly from the following specification in connection with the accompanying drawings, in which:

FIGURE 1 diagrammatically illustrates a side view of a plate filter press equipped with a displacing arrangement according to the invention, FIGURE 1 showing a plate being displaced;

FIGURES 2 to 5 respectively illustrate in view various positions of the conveying member during the displacing operation of a plate;

FIGURE 6 diagrammatically illustrates in view the position of the conveying member after all plates have been displaced;

FIGURE 7 diagrammatically illustrates in view the position of the conveying member during the return movement thereof to its starting position;

FIGURE 8 is a diagrammatic representation of a cross-section through a filter press according to the present invention, said section being taken along the line VIII—VIII of FIGURE 1;

FIGURE 9 is a top view of a portion of the filter press during the displacement of a plate;

FIGURE 10 is a view of the filter press as seen in the direction of the arrow X of FIGURE 1;

FIGURE 11 is a longitudinal section of a portion of the conveying member with a shaft;

FIGURE 12 shows a view of a portion of the conveying member with an element adapted to exert a braking or retaining effect; and FIGURE 13 shows a detail of a helically grooved sleeve employed as conveying member in the displacing arrangement according to the present invention.

The present invention is characterized primarily in that the displacing arrangement comprises at least one rotatable conveying member which is displaceable in axial direction of the filter press while the displacing movement is braked or retarded. The said conveying member is preferably guided by a shaft or the like and rotates together therewith while the length of the conveying member, as a rule, is somewhat greater than the displacement stroke of the individual plates or frames so that the respective plate or frame which is displaced until it abuts, will still somewhat remain in engagement with the conveying member. As a result thereof, the occurring counter pressure will bring about a displacement of the conveying member on said shaft, and during this displacement of the conveying member on the shaft, the conveying member will at one end release the plate or frame already displaced while at the same time causing its other end to engage the next plate or frame to be displaced.

According to the invention, the perferably cylindrically designed sleeve-shaped conveying member is, for instance, provided with a helical groove or the like which, during the rotation of the conveying member, engages the respective plate or frame next to be displaced, and displaces the same. The conveying member which may, for instance by a key and groove, be connected to the shaft, is adapted to be displaced in the axial direction of the shaft but will also be rotated by the shaft.

In conformity with the present invention, the conveying member is braked or retarded in its direction of displacement on the shaft while the resistance of the conveying member against displacement is somewhat greater than the resistance of a plate against displacement. If, however, one conveying member each is arranged on both longitudinal sides of the press, the total resistance against displacements of both conveying members should amount to only slightly more than the resistance of a plate against displacement.

For purposes of obtaining the necessary resistance against displacement, it may be necessary that the conveying member and/or the shaft be provided with braking or retarding elements or means as, for instance a brake lining or the like. Moreover, if desired one or more braking or retarding elements such as spring-loaded members engaging the shaft may be mounted on the conveying member. In such an instance, it is advantageous to provide the shaft with recesses or the like adapted to be engaged by a spring-loaded member. A braking or retarding element may also be arranged on the conveying member in such a way that it acts upon the respective plate or frame next to be displaced or upon other parts if the press as, for instance the supporting rails or the like. In order, during the start of the displacement of the plates or frames, to assure an engagement of the conveying member with the first frame or plate to be displaced and also to assure a return of the conveying member to its starting position after completion of the displacement of all of the plates or frames, one pressure member each is provided at the end ranges of the shaft which will exert a pressure upon the conveying member. Such pressure member may consist, for instance of a helical spring or the like.

Referring now to the drawings in detail, the plate filter press illustrated in FIG. 1 rests on stands 1 and comprises two bearing heads 2 and 3 which are interconnected by two laterally arranged supporting rails 4. Square-shaped filter plates 7 are adapted to slide along said supporting rails or bars 4. These plates 7 are provided with raised marginal beads 5, slurry passages 6 and guiding noses 18 (see FIG. 8). The filter plates 7 are lined with filter material (not shown) as, for instance filter cloths or the like. The arrangement furthermore comprises a hydraulically operable piston 8 having connected thereto a pressure plate 9. By actuation of said hydraulically operable piston 8 and pressure plate 9, it is possible to close the filter chambers by pressing the plates 7 against the bearing head 3.

According to the specfic embodiment illustrated in FIGS. 1 to 10, a shaft 10 is arranged at each side of the press and extends in longitudinal direction thereof. Shafts 10 are supported by bearings 13 connected to the bearing heads 2 and 3. As will be evident from the drawing, each shaft 10 has mounted thereon a conveying member 11, for instance a sleeve or the like provided with a helical groove 12 so that the conveying member 11 will rotate together with its respective shaft 10 and will be adapted to be displaced on said shaft in axial direction thereof. In order to accomplish this, the connection between the conveying member 11 and its shaft 10 is effected by a key 17 and groove (FIG. 8) or by a profiled shaft with a corresponding bore in the conveying member 11. Shafts 10 together with which the conveying members 11 are rotated, are, in the longitudinal direction of the press, journalled in such a manner that the helical grooves 12 of conveying member 11 engage guiding noses 18 arranged on both sides of the press and pertaining to plates 7 (FIGS. 8, 9 and 12) and are adapted to displace said plates 7 along the conveying member 11.

According to the present invention, the conveying member 11 is braked or retarded in axial direction, if necessary, by the application of any desired means. This may be realized as shown in FIG. 13 by the arrangement of braking means as, for instance by the provision of a brake lining 24 on shaft 10 and/or on the wall of the bore of the conveying member 11 as well as by making shaft 10 e.g. of rubber or synthetic materials used as brake linings in motor vehicles, which have a braking effect. Moreover, as will be evident from FIG. 11, a spring-loaded element 19 as, for instance a ball or the like, may be mounted in the conveying member 11. Such spring-loaded member presses against shaft 10 and when the conveying member 11 is being displaced, will each time engage one of the notches 20 thereby retarding the conveying member 11 in its movement along the axis of shaft 10. It is, of course, to be understood that when the resistance against displacement of the conveying members 11 on shafts 10 is by itself greater than the resistance against displacement offered by the individual plates 7 on supporting rails 4, no additional braking or retarding means are required.

Each shaft 10 has provided thereon two helical springs 21 and 21' (FIG. 1). The helical springs 21 merely serve the purpose of pressing the conveying member 11 at the start of the displacement of the plates against the guiding noses 18 at both sides of the first plate 7 to be displaced (FIG. 2). The spring stroke of the helical springs 21 is limited and should be somewhat less than the thickness of one plate 7. On the other hand, it is advantageous when the helical springs 21' on the other end of the shaft have a spring stroke which is longer by several times. Furthermore, it is necessary that the spring force of helical springs 21 and 21' mounted on one shaft 10 be greater than the resistance against displacement offered by the conveying member 11 on said shaft.

The shafts 10 (FIGS. 8 to 10) arranged on both sides of the press have each mounted thereon a sprocket wheel 14 and these sprocket wheels will at precisely the same speed and in precisely the same direction of rotation be actuated by a circulating chain 15, through the intervention of a sprocket 24 if motor 16. However, if desired, the chain drive may also be replaced by another drive as, for instance a gear drive.

The operation of the new displacing device is, in conformity with FIGS. 1 to 10 as follows:

FIG. 2 illustrates the position of the conveying member 11 directly prior to the respective start of the plate displacement. After switching on motor 16, the two shafts 10 arranged at both sides of the press will together rotate in the direction with the conveying member 11 of the arrow indicated in FIG. 2. As a result thereof, and in view of the pressure exerted by the loaded helical spring 21, the conveying members 11 move toward the left until the helical grooves 12 of the conveying members 11 engage the respective adjacent guiding noses 18 of the plate 7 first to be displaced (FIG. 3). The helical springs 21 are now in relaxed condition. Engaged plate 7 will then by means of the rotating conveying member 11 be displaced toward the right until it abuts the pressure plate 9 (FIG. 4). The guiding noses 18 of plate 7, which now has come to a standstill, bring about a counter pressure by which the conveying members 11 are displaced on the two shafts 10 toward the left by a distance corresponding to the thickness of a plate (FIG. 5). During this operation, the conveying members 11 at the right-hand end thereof release the displaced plate 7 and simultaneously at their left end engage the two guiding noses 18 of that plate 7 which is next to be displaced and which is now moved toward the right until it abuts against the previously displaced plate 7. These operations are repeated until the entire pile of plates 7 has been displaced toward the right (FIG. 6). The return of the conveying members 11 to their starting position is aided by the springs 21, 21'; the thrust and the length of these springs acting upon the conveying members 11 are so dimensioned that when reversing the direction of rotation of the shafts or spindles 10, the conveying members 11 will engage at least the guiding noses 18 of the first two plates 7 of the filter packet. In view of the positive engagement of the guiding noses 18 of the two plates with the helical thread 12 of the conveying members 11, a frictional resistance of the guiding noses 18 is exerted upon the supporting rails 4, which exceeds the frictional resistance of the conveying members 11 on the respective driving shaft 10. This greater resistance overcomes the frictional force necessary for driving the worms or conveying members 11 on the shafts 10 and forces said conveying members 11 with increasing engagement with the guiding noses if the remaining plates of the filter packet back into the starting position shown in FIG. 7. It will thus be evident that when for purposes of returning the conveying members 11 from their FIG. 6 position to their starting position, motor 16 is switched over for rotation in the opposite direction so that the conveying members 11 will rotate in the direction of the arrow of FIG. 6, the pressure of the loaded helical springs 21 brings about an engagement of the conveying members 11 with the guiding noses 18 of the plates 7 which are arranged adjacent to each other and are at a standstill whereby the conveying members 11 will be displaced toward the right alongside the pile of plates 7. When the conveying members 11 are located in the right-hand end range of the pile of plates 7 (FIG. 7), motor 16 is switched off. In customary manner, the pile of plates 7 is then displaced toward the left by pressure plate 9 and is pressed against the bearing head 3 while the stationary conveying members 11 are moved together with the pile of plates 7. The mass of slurry to be filtered is then pumped into the press chambers until the filtering operation has been completed. Subsequently, the hydraulic press piston 8 returns pressure plate 9 toward the right whereupon motor 16 is again switched on. As a result thereof, the rotating conveying members 11 are displaced further toward the right into the position shown in FIG. 2. Motor 16 is then reversed as to its direction of rotation and a new cycle of the displacement operation of plates 7 is initiated.

In the specific embodiment shown in the drawings, shafts 10 arranged at both sides of the press, are, together with the conveying members 11, arranged on the same level as the supporting bars, while the conveying members 11 laterally engage the guiding noses 18 or the guiding means for the plates. However, in conformity with the present invention, shafts 10 may be arranged in conformity with any requirements in the longitudinal direction of the press so that, for instance, the conveying members 11 engage the plate guiding means from above or from below. If necessary, followers as, for instance pins or the like may be arranged on the frames for engagement by the conveying member 11. With filter presses in which plates 7 are suspended at the top or guided at the top, the arrangement of one shaft 10 with conveying member 11 above the pile of plates 7 in longitudinal direction of the press may suffice.

In order to assure that with each respective engagement of the guiding noses 18 of a plate 7 by conveying member 11, the next adjacent plate 7 will not be displaced, there is in conformity with FIG. 12 provided at least one braking or retarding member at the conveying member 11. Such braking or retarding member may, for instance, be an elastic circular disc 23 or the like which preferably is loosely arranged on shaft 10 and which not only has a blocking effect upon the respective adjacent plate 7 but at the same time also axially brakes or retards the conveying member 11. When conveying member 11 engages the guiding nose 18 of the respective plate 7 to be displaced, disc 23 will laterally engage guiding nose 18 of the adjacent plate 7 which will thereby be blocked. During the displacement of disc 23 over the guiding noses 18, said disc 23 will laterally flex and while being loosely connected with the conveying member 11, will stand still, especially when engaging the respective guiding nose 18. Advantageously, disc 23 is made of spring steel.

As will be obvious from the above, the displacing device according to the present invention may be employed also for displacing plates and frames in frame filter presses or in similarly working filtering devices and may if so desired, also be employed for displacing other pressed parts.

Summarizing the present invention, it will be appreciated from the above that the filter press according to the present invention, which comprises primarily two main parts namely a conveying member and a shaft, represents an extremely simple and therefore reliable automatic displacing arrangement which is particularly well suitable for plate and frame filters. By changing the direction of rotation of the shafts, the plates and frames may be displaced, if so desired, in both directions on the supporting arms. The invention will assure that always one plate or frame only will be displaced at a time because when a specifically designed conveying member engages a plate or frame, also an automatic blocking of the adjacent plate or frame will be effected. The new displacing arrangement according to the present invention, which is, as a rule, actuated by one motor only, may also be installed in already completed filter presses.

It is, of course, to be understood that the present invention is, by no means, limited to the particular arrangements shown in the drawings but also comprises any modifications within the scope of the appended claims.

It is also to be understood that the term "plate means" as it appears in the claims attached hereto covers both plates and frames.

What I claim is:

1. In combination: supporting means, longitudinal guiding means supported by said supporting means, a plurality of plate means guided by and individually displaceable along said guiding means in the longitudinal direction thereof for selective engagement with and disengagement from each other, and rotatable conveying means displaceable in the longitudinal direction of said guiding means and operable in response to a certain movement in the longitudinal direction of said guiding means to engage one and disengage another one of said plate means, said conveying means also being operable in response to a certain rotative movement thereof to move each of said plate means individually out of engagement with one and into engagement with another one of said plate means, said conveying means being so constructed and arranged that the longitudinal displacement of the conveying means is caused by each of said plate means moving out of engagement with one and into engagement with another of said plate means.

2. In combination: supporting means, longitudinal guiding means supported by said supporting means, a plurality of plate means guided by and individually displaceable over a certain displacement stroke along said guiding means in the longitudinal direction thereof for selective engagement with and disengagement from each other, rotatable shaft means extending in longitudinal direction of said guiding means, driving means drivingly connected to said shaft means for rotating the same, and conveying means rotatably connected to said shaft means and displaceable relative to said shaft means in axial direction thereof, said conveying means having a length slightly in excess of the displacement stroke of each of said plate means so that each plate means when displaced over said certain displacement stroke is still engaged by said conveying means whereby in response to a further rotation of said conveying means the latter is displaced in a direction opposite to the direction of displacement of the respective plate means last displaced so that that end of said conveying means which last engaged the respective last displaced plate means will disengage the latter whereas the other end of said conveying means will engage the plate means next to be displaced.

3. In combination: supporting means, longitudinal guiding means supported by said supporting means, a plurality of plate means guided by and individually displaceable over a certain displacement stroke along said guiding means in the longitudinal direction thereof for selective engagement with and disengagement from each other, rotatable shaft means extending in longitudinal direction of said guiding means, driving means drivingly connected to said shaft means for rotating the same, and sleeve means rotatably connected to but axially slidably mounted on said shaft means and provided with helical means for selective engagement with and disengagement from each individual one of said plate means, said sleeve means being operable in response to a certain movement in the longitudinal direction of said guiding means to engage one and disengage another one of said plate means, said sleeve means also being operable in response to a certain rotative movement thereof to move each of said plate means individually out of engagement with one and into engagement with another one of said plate means.

4. An arrangement according to claim 3, in which said sleeve means is connected to said shaft means by a key-and-groove arrangement.

5. In combination: supporting means, longitudinal guiding means supported by said supporting means, a plurality of plate means guided by and individually displaceable along said guiding means in the longitudinal direction thereof for selective engagement with an disengagement from each other, rotatable conveying means displaceable in the longitudinal direction of said guiding means, the resistance of said conveying means against displacement in the longitudinal direction of said guiding means being greater than the resistance of said plate means against displacement thereof, said conveying means being operable in response to a certain movement in the longitudinal direction of said guiding means to engage one and disengage another one of said plate means, said conveying means also being operable in response to a certain rotative movement thereof to move each of said plate means individually out of engagement with one and into engagement with another one of said plate means, said conveying means being so constructed and arranged that the longitudinal displacement of the conveying means is caused by each of said plate means moving out of engagement with one and into engagement with another of said plate means.

6. In combination in a filter press: longitudinal guiding means arranged on opposite sides of said press and extending in the longitudinal direction thereof, a plurality of plate means guided by and individually displaceable along said guiding means in the longitudinal direction thereof for selective engagement with and disengagement from each other, a pair of rotatable conveying means respectively arranged on opposite sides of said press and each being displaceable in the longitudinal direction of said guiding means, the total resistance of both of said conveying means against displacement thereof in the longitudinal direction of said guiding means being greater than the resistance of each of said plate means against displacement thereof, means drivingly connected to said two conveying means for substantially synchronously driving the same, each of said conveying means being operable in response to a certain movement in the longitudinal direction of said guiding means to engage one and the same plate means and disengage another one but the same one of said plate means, said conveying means also being operable in response to a certain rotative movement thereof to move one and the same one of said plate means individually out of engagement with one and into engagement with another one of said plate means, said conveying means being so constructed and arranged that the longitudinal displacement of the conveying means is caused by each of said plate means moving out of engagement with one and into engagement with another of said plate means.

7. An arrangement according to claim 2, in which at least one of said two members namely said shaft means and said conveying means is provided with means impeding but not preventing the displacement of said conveying means in the longitudinal direction of said shaft means.

8. In combination: supporting means, longitudinal guiding means supported by said supporting means, a plurality of plate means guided by and individually displaceable over a certain displacement stroke along said guiding means in the longitudinal direction thereof for selective engagement with and disengagement from each other, rotatable shaft means extending in longitudinal direction of said guiding means, driving means drivingly connected to said shaft means for rotating the same, conveying means rotatably connected to said shaft means and operable in response to a certain rotative movement thereof to move each of said plate means individually out of engagement with one and into engagement with another one of said plate means, said conveying means also being displaceable on said shaft means in axial direction thereof for engaging one and disengaging another one of said plate means, and means operatively connecting said shaft means and said conveying means and normally preventing axial relative movement thereof but adapted to be made ineffective in response to a certain pressure acting on said conveying means in axial direction of said shaft means to thereby permit axial relative displacement of said shaft means and said conveying means.

9. An arrangement according to claim 8, in which said shaft means is provided with spaced recess means, and in which said conveying means is provided with yieldable means for engagement with said recess means.

10. In combination: supporting means, longitudinal guiding means supported by said supporting means, a plurality of plate means guided by and individually displaceable over a certain displacement stroke along said guiding means in the longitudinal direction thereof for selective engagement with and disengagement from each other, rotatable shaft means extending in longitudinal direction of said guiding means, driving means drivingly connected to said shaft means for rotating the same, conveying means rotatably connected to said shaft means and displaceable relative to said shaft means in axial direction thereof, and yieldable pressure exerting means respectively arranged at opposite end portions of said shaft and operable to exert upon said conveying means a pressure greater than the resistance of said conveying means against displacement of said shaft means in axial direction thereof, said conveying means having a length slightly in excess of the displacement stroke of each of said plate means so that each plate means when displaced by rotation of said conveying means over said certain displacement stroke is still engaged by said conveying means so that in response to a further rotation of said conveying means the latter is displaced in a direction opposite to the direction of displacement of the respective plate means last displaced so that end of said conveying means which last engaged the respective last displaced plate means will disengage the latter whereas the other end of said conveying means will engage the plate means next to be displaced.

11. An arrangement according to claim 10, in which said yieldable pressure exerting means consist of a first spring having an effective maximum stroke slightly shorter than the thickness of any one of said plate means, and of a second spring having a maximum stroke equalling at least the thickness of a plurality of said plate means.

12. An arrangement according to claim 1, which includes means operable in response to the engagement of said conveying means with a plate means to be displaced to prevent the next successive plate means from moving with the first-mentioned one, said conveying means being so constructed and arranged that the longitudinal displacement of the conveying means is caused by each of said plate means moving out of engagement with one and into engagement with another of said plate means.

13. An arrangement according to claim 1, which includes yieldable means arranged adjacent said conveying means and operable when said conveying means engages a plate means to be displaced to prevent the next successive plate means from moving with the first-mentioned one.

References Cited

UNITED STATES PATENTS

| 1,767,318 | 6/1930 | Shaw | 210—230 X |
| 3,251,472 | 5/1966 | Kurita | 210—230 |

FOREIGN PATENTS

| 538,381 | 6/1955 | Belgium. |
| 920,379 | 3/1963 | Great Britain. |

SAMIH N. ZAHARNA, *Primary Examiner.*

REUBEN FRIEDMAN, *Examiner.*

C. DITLOW, *Assistant Examiner.*